United States Patent
Lin et al.

(10) Patent No.: US 8,050,162 B2
(45) Date of Patent: Nov. 1, 2011

(54) TILT CONTROL METHOD OF NEAR-FIELD OPTICAL SYSTEM

(75) Inventors: Wei-Chih Lin, Hsinchu (TW); Ling-Hao Yu, Hsinchu (TW); Chen-I Kuo, Hsinchu (TW)

(73) Assignee: Lite-On It Corporation, Taipei (TW)

( * ) Notice: Subject to any disclaimer, the term of this patent is extended or adjusted under 35 U.S.C. 154(b) by 0 days.

(21) Appl. No.: 12/785,204

(22) Filed: May 21, 2010

(65) Prior Publication Data

US 2011/0141864 A1 Jun. 16, 2011

(30) Foreign Application Priority Data

Dec. 15, 2009 (CN) .......................... 2009 1 0261458

(51) Int. Cl.
*G11B 7/00* (2006.01)
(52) U.S. Cl. .................. 369/53.19; 369/13.33
(58) Field of Classification Search ............... 369/53.19, 369/44.32, 13.33
See application file for complete search history.

(56) References Cited

U.S. PATENT DOCUMENTS

| | | | | |
|---|---|---|---|---|
| 2005/0180283 | A1* | 8/2005 | Ishimoto et al. | 369/53.19 |
| 2005/0259530 | A1* | 11/2005 | Ishimoto et al. | 369/44.32 |
| 2006/0077788 | A1* | 4/2006 | Shinoda | 369/44.23 |
| 2006/0255247 | A1* | 11/2006 | Saito et al. | 250/216 |
| 2007/0091743 | A1* | 4/2007 | Lee et al. | 369/44.32 |
| 2007/0242583 | A1* | 10/2007 | Huang et al. | 369/53.41 |
| 2008/0106982 | A1* | 5/2008 | Seo et al. | 369/44.22 |
| 2008/0205233 | A1* | 8/2008 | Chin | 369/94 |
| 2008/0239890 | A1* | 10/2008 | Asai | 369/44.23 |
| 2009/0067302 | A1* | 3/2009 | Ishimoto | 369/47.15 |
| 2009/0141597 | A1* | 6/2009 | Verschuren | 369/43 |
| 2009/0190453 | A1* | 7/2009 | Lee et al. | 369/53.19 |
| 2011/0002208 | A1* | 1/2011 | Futakuchi et al. | 369/53.19 |

* cited by examiner

*Primary Examiner* — Thang Tran
(74) *Attorney, Agent, or Firm* — Rabin & Berdo, P.C.

(57) ABSTRACT

A tilt control method for a near-field optical disc drive is provided. A gap between a lens and a disc is estimated. A tilt compensation for the lens is estimated according to a tilt signal when the lens is within a far-field region. A coarse tilt control is performed on the lens according to the tilt compensation when the lens is within the far-field region.

12 Claims, 5 Drawing Sheets

TILT CONTROL METHOD OF NEAR-FIELD OPTICAL SYSTEM

This application claims the benefit of People's Republic of China application Serial No. 200910261458.1, filed Dec. 15, 2009, the subject matter of which is incorporated herein by reference.

BACKGROUND OF THE INVENTION

1. Field of the Invention

The invention relates in general to a tilt control method of a near-field optical system.

2. Description of the Related Art

For the existing disc technology, the increase in storage capacity can be implemented by way of multi-layered rewritable discs or by reducing the size of the focused light spots for increasing the storage capacity per layer, hence increasing the total storage capacity of a disc. The size of the focused light spots is normally determined according to the wavelength of the laser light and the numerical aperture (NA) of the optical system. In general, a light source with short wavelength and an optical system with large numerical aperture can generate small focused light spots.

Due to the development in the increase of the storage capacity of the disc in recent years, the wavelength of the laser light has become shorter and shorter, and the laser light has been changed from the infra-red light laser (for use in CD) to the red light laser (for use in DVD), and further to the blue light laser. Since the blue light laser is used as the laser light, the related development in increasing the storage capacity of the disc is directed to reading/writing a disc with a near-field optical system for generating smaller focused light spots by increasing NA value. To increase the NA value, the near-field optical system normally generates focused light spots with an assembly of an object lens (convex lens) and a solid immersion lens (SIL). When reads/writes a disc with a near-field optical system, the gap between the SIL and the disc surface would become even smaller such as about 30-100 nm if a blue light laser is used, and such region is called near-field region.

Since the perpendicularity between the focused beam and the disc data layer affects the capability and accuracy of an optical disc drive in the read/write of data, the drive normally performs tilt control on the optical system (or the optical head) during the read/write of data, so that the focused beam is perpendicular to the disc data layer. However, the SIL and the disc surface are very close when a near-field optical system is used for reading/writing a disc. Therefore, how to perform the tilt control on the SIL and how to avoid the SIL colliding with the disc have become a prominent task for the industries.

However, before entering the near-field region, if the tilt angle between the SIL of the optical head and the disc is very large, the distance between the SIL and the disc might be erroneously judged. Under the case that the gap ranges 30-100 nm, the SIL may easily collide with the disc during adjustment of the tilt angle of the optical head. Thus, the accuracy of the near-field optical disc drive is negatively affected. Besides, for a generally known near-field optical disc drive, when the optical head is still within a far-field region (the gap between the SIL and the disc surface is larger than the near-field region), the position of the SIL can hardly be determined, and the tilt control cannot be performed on the optical head (or the SIL) within the far-field region.

SUMMARY OF THE INVENTION

One embodiment of the invention is directed to a tilt control method for a near-field optical disc drive. When the SIL is still located within the far-field region, the tilt angle of the SIL is controlled as early as possible to avoid the SIL colliding with the disc.

One embodiment of the invention is directed to a tilt control method for a near-field optical disc drive. The method determines when to start fine tilt control on the SIL, so that the SIL is conformed to the tilt margin when the SIL enters the near-field region.

According to an example of the present invention, a tilt control method for a near-field optical disc drive is provided. A gap between a lens and a disc is estimated. A tilt compensation for the lens is estimated according to a tilt signal when the lens is still within a far-field region. A coarse tilt control is performed on the lens according to the tilt compensation when the lens is within the far-field region.

The invention will become apparent from the following detailed description of the preferred but non-limiting embodiments. The following description is made with reference to the accompanying drawings.

DETAILED DESCRIPTION OF THE INVENTION

For the near-field optical disc drive, when the optical head is still within the near-field region, the gap between the SIL of the optical head and the disc surface may only range 30-100 nm, so that the range of tilt angle control of the optical head cannot be too wide. Conventionally, when the optical head is still within the far-field region, the position of the SIL can hardly be obtained, so the tilt control cannot be performed when the optical head (or the SIL) is still within the far-field region.

For the near-field optical disc drive, the tilt margin includes a spindle tilt margin, an SIL tilt margin and a disc bending angle margin. In general, the tilt margin is related to the structure, such as the shape and the tip size of the SIL.

Figure 1A:
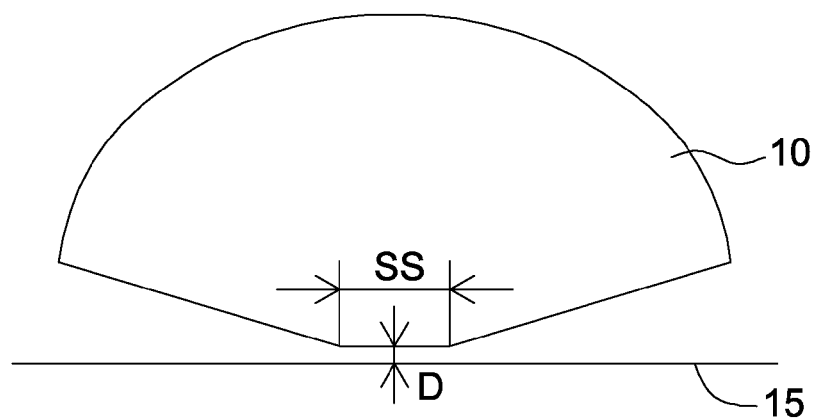
FIG. 1A shows a relation between an SIL and a disc.
Figure 1B:
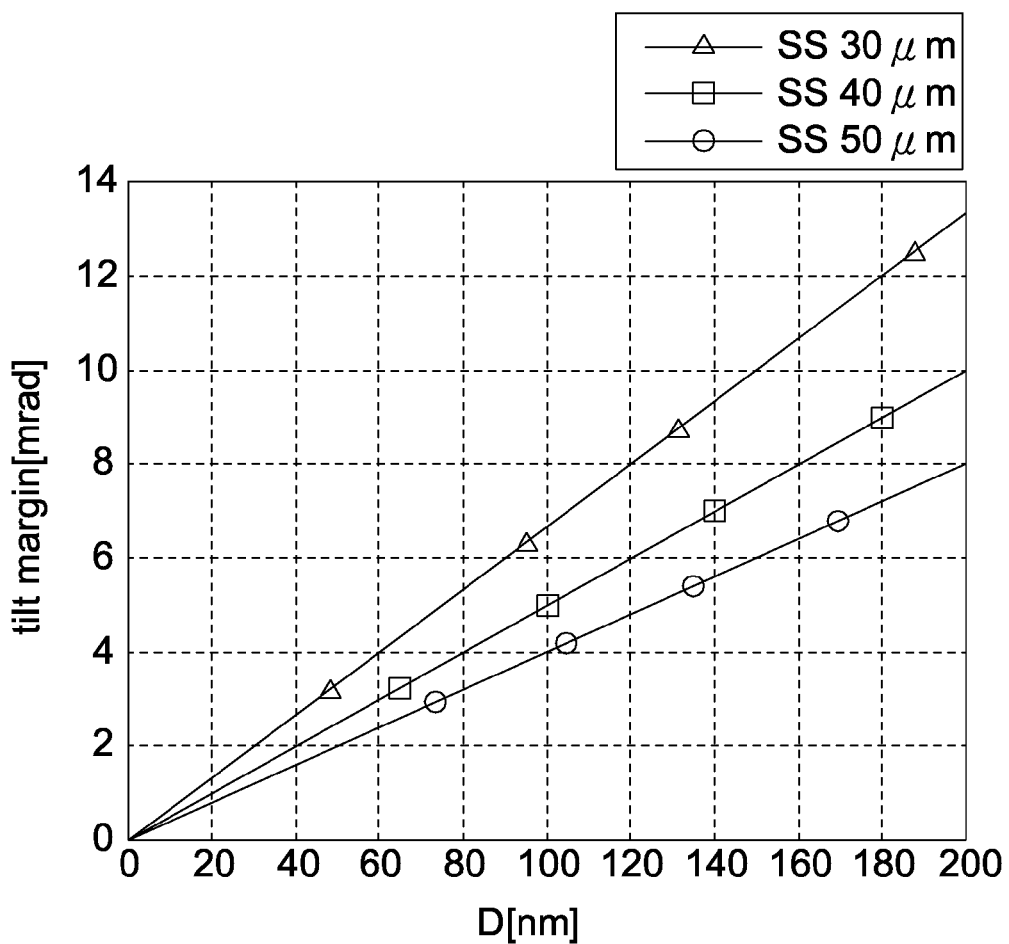
FIG. 1B shows a relation diagram of the tilt margin vs. the gap D, wherein the gap D denotes the gap between the SIL and the disc surface.

FIG. 1A shows a relation between an SIL and a disc. FIG. 1B shows a relation diagram of the tilt margin vs. the gap D, wherein the gap D denotes the gap between the SIL and the disc surface.

In FIG. 1A, SS denotes the tip size of the SIL 10, and the distance D denotes the gap between the SIL 10 and the surface of the disc 15. In general, the tip size SS of the SIL 10 is about 40 μm. As indicated in FIG. 1B, if the gap D is about 100 nm and the tip size SS of the SIL 10 is about 40 μm, the tilt margin is 5 mrad (about 0.275 degrees). This implies that under such circumstance, the tilt angle (the angle contained by the tip surface of the SIL and the surface of the disc) of the SIL 10 must not exceed 5 mrad otherwise the tip/edge of the SIL 10 will collide with the disc 15. In the present embodiment of the invention, when the SIL 10 is still within the far-field region, the control of the tilt angle of the SIL 10 already starts, so that when the SIL 10 approaches the near-field region, the tilt angle to be adjusted is not large. So that, it is prevented that the tilt angle on SIL 10 within the near-field region exceeds the tilt margin.

Referring to FIG. 10, an assembly diagram of a lens 18 and the SIL 10 is shown. As indicated in, the lens 18 converges parallel lights so that incident angles of the converged parallel lights on the SIL 10 are different. According to the formula: $NA=n_{SIL}*\sin\theta$ (wherein $n_{SIL}$ denotes the refractive index of a SIL and $\theta$ denotes incident angle of a beam), the beams incident on the SIL 10 at different angles have different NA values. The incident angle with the NA value being equal to 1 is defined as a total reflective angle $\theta_c$. Let the NA value being equal to 1 as a demarcation. If the NA value of the beam incident on the SIL 10 is smaller than 1 (that is, the incident angle of the beam is smaller than the total reflective angle $\theta_s$), then the beam will penetrate the SIL 10. To the contrary, if the NA value of the beam incident on the SIL 10 is larger than 1 (that is, the incident angle of the beam is larger than or is equal to the total reflective angle $\theta_c$), then the beam will be totally reflected by the SIL 10.

For the near-field optical system to form focused light spots on the disc 15, the gap D between the SIL 10 and the surface of the disc 15 must be far smaller than the wavelength $\lambda$ of the incident light. In general, the gap $D<=\lambda/10$. If the condition of the gap D is met (that is, the gap $D<<\lambda$), then the beam whose NA value is smaller than 1 will penetrate the SIL 10 and will be focused on the disc. However, the focused light spots of the beam is too large to be used for reading/writing the grooves and the recording marks whose sizes are already smaller than the analytic limit of the focused light spots. On the contrary, the beam whose NA value is larger than 1 will be totally reflected by the SIL 10 if the SIL 10 is still outside the near-field region.

However, if the distance between the SIL 10 and the surface of the disc 15 approaches the gap D ($D<=\lambda/10$), due to the photon tunneling effect, the beam whose NA value is larger than 1 goes through the gap D and is focused on the disc 15. As for the near-field optical disc drive, the drive reads/writes with the smaller focused light spots formed by the beam whose NA is larger than 1. Besides, the focused light spots respectively formed by the beam whose NA is smaller than 1 and the beam whose NA is larger than 1 are not on the same plane, so the problem of mutual interference will not occur.

Figures 1C, 2A:
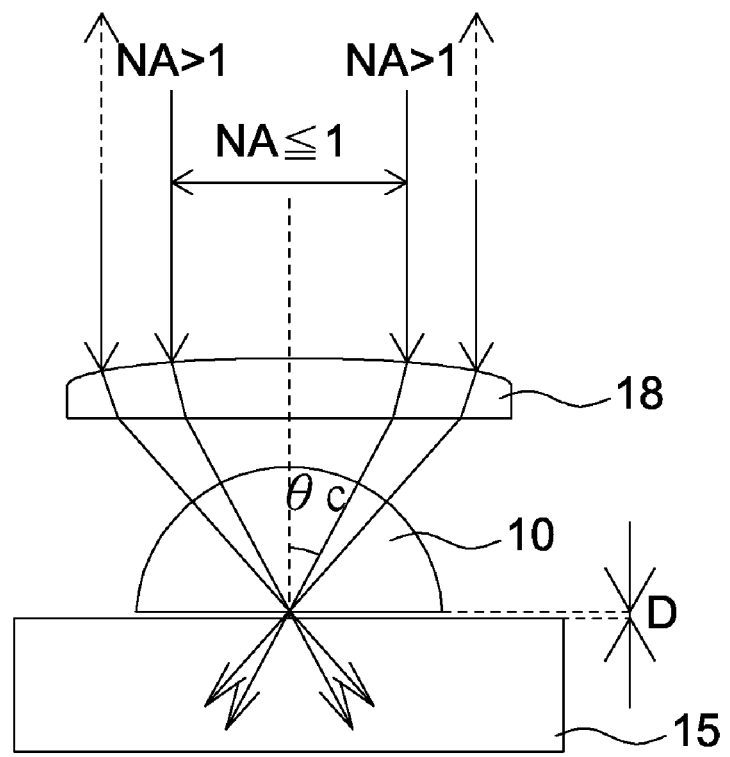
FIG. 1C shows an assembly diagram of a lens and an SIL.
FIG. 2A shows one set of photo detection IC.
Figure 2B:
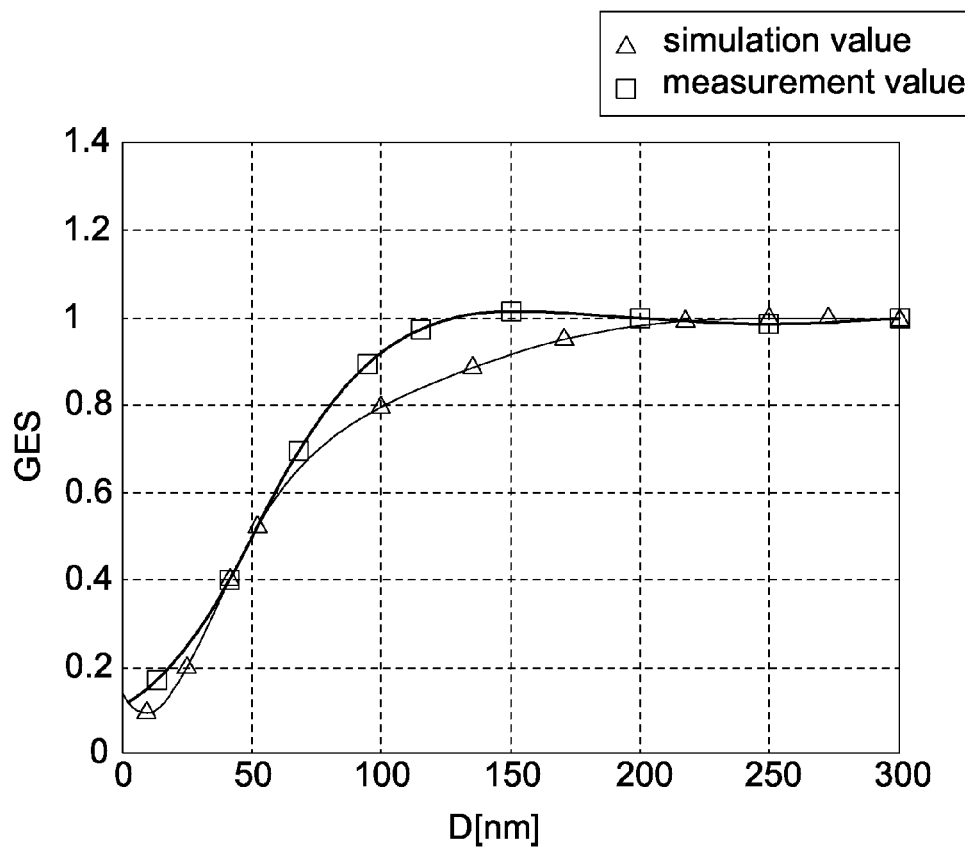
FIG. 2B shows a relation diagram of the gap error signal (GES) vs. the gap D.
Figure 3:
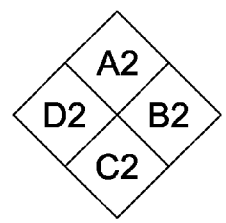
FIG. 3 shows another set of photo detection IC.

When light is reflected toward the near-field optical disc drive from the disc, due to the different polarization directions, the reflective light will form two different optical paths in the near-field optical disc drive and will be respectively received by two sets of photo detection IC (PDIC). Here, the photo detection IC is realized by such as a four-quadrant photodiode. One set of the photo detection IC is illustrated in FIG. 2A, and the other set of photo detection IC is illustrated in FIG. 3. For the photo detection IC of FIG. 2A, the sum of the signal intensities received by the four photodiodes A1~D1 of the photo detection IC of FIG. 2A is defined as a gap error signal (GES), that is, GES=A1+B1+C1+D1. FIG. 2B shows a relation diagram of the gap error signal (GES) vs. the gap D. For the photo detection IC of FIG. 3, the sum of the signal intensities received by the four photodiodes A2~D2 of the photo detection IC of FIG. 3 is defined as a radio frequency (RF) signal, that is, RF=A2+B2+C2+D2.

Figure 4:
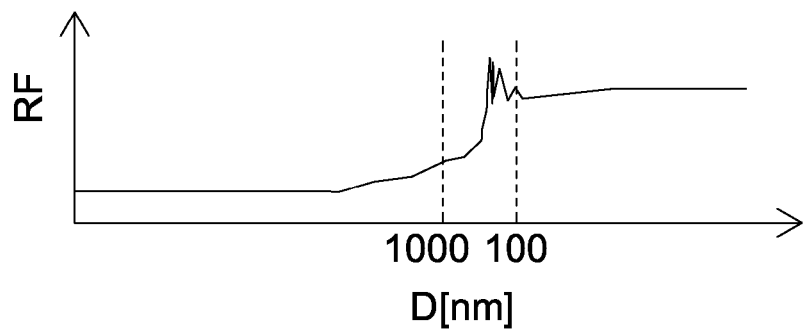
FIG. 4 shows a relation diagram of the reflective light intensity F vs. the gap D.

FIG. 4 shows a relation diagram of the reflective light intensity F vs. the gap D, wherein the reflective light intensity F is the sum of the beam intensities received by the two sets of photo detection IC. In FIG. 4, when the SIL 10 is still located within the far-field region and the gap D is too large, most of the beam reflected by the disc 15 is not received by the photo detection IC, and thus light received by the photo detection IC is weaker (further, light received could be the background light), so the reflective light intensity F is smaller. When the SIL 10 gradually moves toward the near-field region from the far-field region and thus the gap D is reduced, the photo detection IC can receive more beams reflected from the disc 15, so the reflective light intensity F gradually increases. In the embodiment of the invention, the current position of the SIL 10 can be obtained according to the relation between the reflective light intensity F and the gap D. As indicated in FIG. 4, when the gap D between the SIL 10 and the disc 15 is 1000 nm, the reflective light intensity F increases significantly. Thus, if the reflective light intensity F increases to a particular value, it is concluded that the SIL 10 is already located at or approaches the 1000 nm of the gap D.

As indicated in FIG. 2B and FIG. 4, when the SIL gradually approaches the disc (that is, the gap D becomes smaller), the gap error signal (GES) decays gradually, but the reflective light intensity F gradually increases. In FIG. 2B, if the gap D is smaller than 200 nm, the gap error signal (GES) starts to decay. In FIG. 4, if the gap D approaches 1000 nm, the reflective light intensity F gradually increases. In the present embodiment of the invention, if the reflective light intensity F starts to increase, the approximate position of the SIL 10 can be obtained. That is, the value of the gap D can be estimated according to the value of the reflective light intensity F. Before the reflective light intensity F starts to increase, the position of the SIL 10 is basically unknown. That is, the value of the gap D cannot be obtained according to the value of the reflective light intensity F because the SIL 10 is still located within a far-field region where the gap D is large, and the reflective light intensity F still does not have any significant change.

The light incident on the low NA part of the SIL 10 will go through the gap D, reach the disc 15, and be reflected by the disc 15. If the SIL 10 is too far away from the disc 15, the light reflected from the disc 15 is neither collected by the SIL 10 nor received by the photo detection IC. However, if the distance between the SIL 10 and the disc 15 is about 1000 nm, the light reflected from the disc will penetrate the low NA part of the SIL 10 and reach the PDIC, so a signal whose amplitude is changed with the reflective light intensity F will be detected.

Figure 5A:
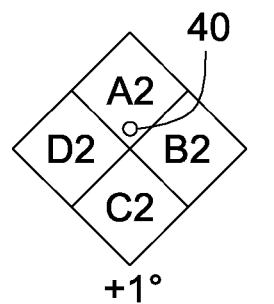
FIG. 5A and FIG. 5B show the simulation of the reflective light of a disc penetrating the low NA part of the SIL and received by the PDIC.
Figure 5B:
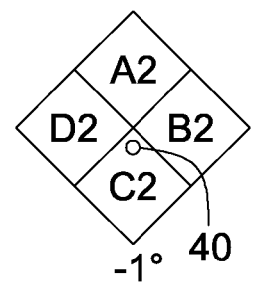

FIG. 5A and FIG. 5B show the simulation of the reflected light penetrating the low NA part of the SIL and received by the PDIC. For simulation purpose, reflectivity of the disc 15 is assumed as 100%. FIG. 5A simulates the light spot 40 projected on the photodiode A2 if the tilt angle of the SIL 10 is +1 degree. Note that the light spot 40 is not an imaging light. FIG. 5B simulates the light spot 40 projected on the photodiode C2 if the tilt angle of the SIL 10 is −1 degree. The light spot 40 is not an imaging light. Thus, if the tilt angles of the SIL 10 are different, then the position of the projection of light spot 40 on the PDIC will also be different.

In the present embodiment of the invention, the signal obtained by deducting the light signal intensity received by the lower photodiode (C2) of the PDIC from the light signal intensity received by the upper photodiode (A2) of the PDIC is called the tilt signal (TS), wherein the light is reflected from the disc 15, penetrates the low NA part of the SIL 10, and is collected by the PDIC. TS can be expresses as: TS=A2−C2. After normalization, TS can be expressed as: TS=(A2−C2)/(A2+C2).

Figure 5C:
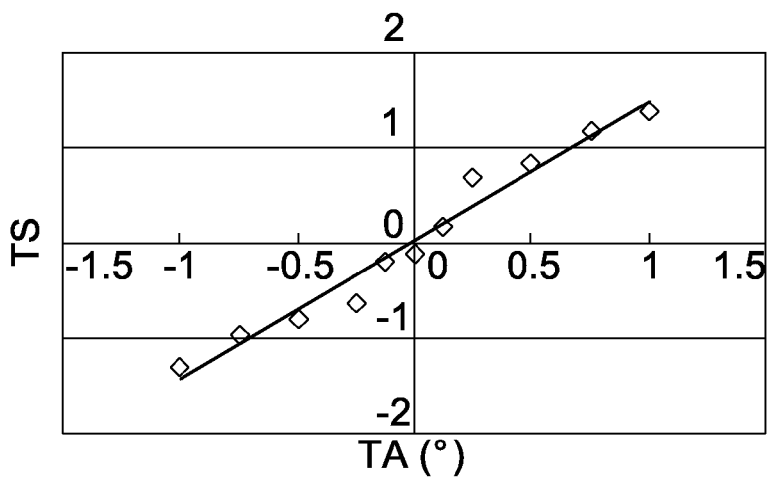
FIG. 5C shows a relation diagram of the tilt signal (TS) vs. the tilt angle of the SIL (TA)

FIG. 5C shows a relation diagram of the tilt signal (TS) vs. the tilt angle of the SIL (TA). If the tilt angle of the SIL (TA) ranges between +1~−1 degree, the tilt signal (TS) can be regarded as linear. Thus, in the embodiment, the tilt angle of the SIL (TA) can be estimated according to the tilt signal (TS) and TA can be used in tilt control of the SIL 10.

In the present embodiment of the invention, the tilt angle of the SIL matching TS=0 is located first. The tilt signals under different tilt angles of the SIL are sampled for estimating the relation between the tilt signal (TS) and the tilt angle of the SIL (TA). For example, by the numeric method, the tilt angle of the SIL matching TS=0 is obtained according to the sampled tilt signals. After the tilt angle of the SIL matching TS=0 is obtained, tilt control of the SIL can be performed accordingly. For example, the tilt control of the SIL in the radial direction and/or in the tangential direction can be performed. That is, the tilt angle of the SIL matching TS=0 is regarded as a compensation value, and the tilt control of the SIL can be compensated in advance. Such tilt control is a merely coarse adjustment, because the SIL is still within the far-field region and is far away from the near-field region, so the high-accuracy fine-tuning adjustment of tilt control is not yet applicable.

The above flow of locating the tilt angle of SIL and the tilt signal can be performed during the initialization of a near-field optical disc drive. In the present embodiment of the invention, after finding the relation between the tilt signal (TS) and the tilt angle of the SIL (TA), the relation can be stored in a memory, and when the optical head is to be moved again, the tilt control of the SIL can be performed according to the stored relation, for saving operation time. Or, during manufacturing of the near-field optical disc drive, the relation between the tilt signal and the tilt angle of the SIL is obtained and stored in the memory by manufacturers for saving the initialization time of the near-field optical disc drive in future use.

In the present embodiment of the invention, when the SIL approaches to the disc but not yet enters the near-field region, the fine-tuning adjustment of tilt control can be performed on the SIL; and when the SIL enters the near-field region, the fine-tuning adjustment of tilt control will be limited to a small degree. Again, referring to FIG. 2B, when the gap error signal (GES) decays to a range value (such as 80%-95%) compared with the value obtained when the SIL is within far-field region, the SIL can be regarded as very close to but has not yet entered the near-field region. In general, the near-field region is about 30-100 nm, and when the gap error signal (GES) decays to a range value (such as 80%-95%) of the value obtained when the SIL is within the far-field region, the gap between the SIL and the disc is about 100~200 nm. Then, the fine-tuning adjustment of tilt control can be performed on the SIL as if the SIL had already entered the near-field region. However, how to perform the fine-tuning adjustment of tilt control is not specified here. Besides, when the SIL already enters the near-field region (that is, the gap error signal (GES) decays to 30%-80% of the value obtained when the SIL is within the far-field region), the fine-tuning adjustment of tilt control can be performed again for better perpendicularity between the focal beam and the data layer of the disc. Therefore, the fine-tuning adjustment of tilt control can be performed on the SIL when the gap error signal (GES) decays to 30%-90% of the value obtained when the SIL is within the far-field region, hence increasing the range for performing the fine-tuning adjustment on the SIL, making the focal beam and disc data layer perpendicular to each other, and improving the read/write effect.

Figure 6:
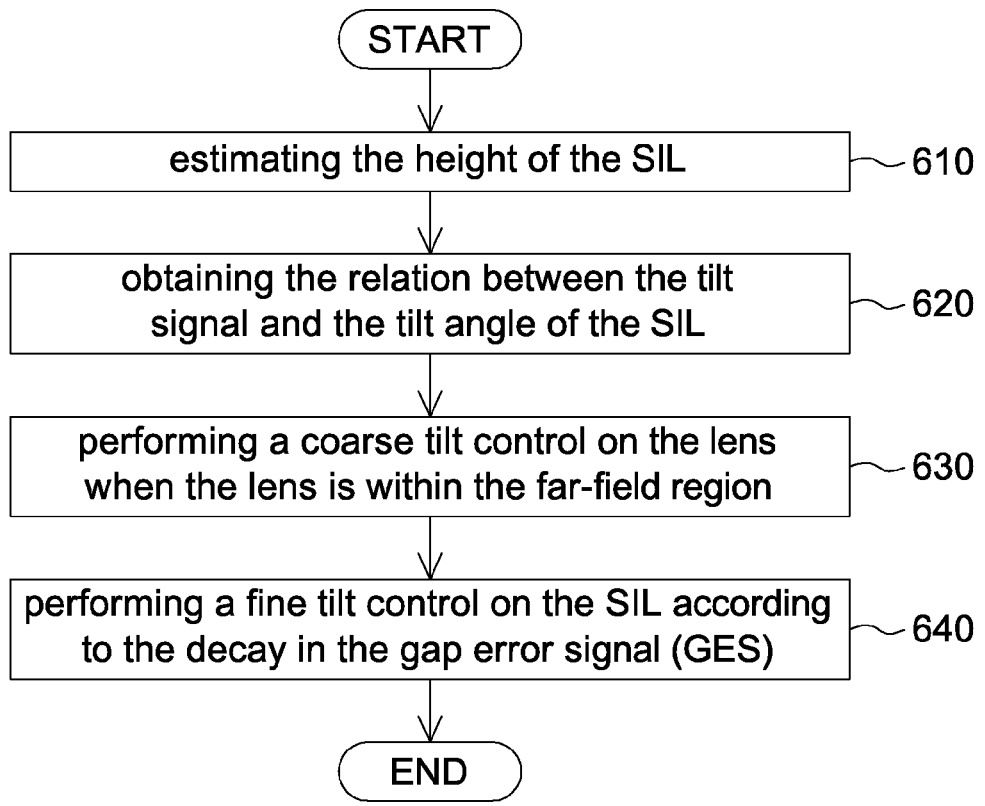
FIG. 6 shows an operation flowchart according to an embodiment of the invention.

Referring to FIG. 6, an operation flowchart according to an embodiment of the invention is shown. As indicated in FIG. 6, at step 610, the height of the SIL is estimated (that is, the gap D between the SIL and the disc is estimated). As disclosed above, when the reflective light intensity F increases to a predetermined value, the position of the SIL is roughly known. That is, the value of the gap D can be estimated according to the value of the reflective light intensity F.

Next, at step 620, the relation between the tilt signal and the tilt angle of the SIL is obtained for obtaining the tilt compensation for the SIL. As is disclosed above, the tilt angle of the SIL matching TS=0 is obtained for compensating the tilt control of the SIL.

At step 630, when the SIL is still within the far-field region, a coarse adjustment control of the tilt angle is performed on the SIL according to the tilt compensation. In the present embodiment of the invention, step 630 can be performed once in static way for performing the coarse adjustment of tilt control on the SIL within the far-field region, or, steps 620 and 630 can be performed for many times in dynamic way (or feedback) on the SIL within the far-field region.

At step 640, when to perform fine-tuning adjustment of tilt control on the SIL is determined according to the decay in the gap error signal (GES). As disclosed above, when the gap error signal (GES) decays to a particular range, the SIL can be regarded as very close to the near-field region, and the fine-tuning adjustment of tilt control can be performed on the SIL. Then, after the SIL already enters the near-field region, further fine-tuning adjustment of tilt control can be performed on the SIL.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A tilt control method for a near-field optical disc drive, comprising:
   estimating a gap between a lens and a disc to be bigger than 100 nm;
   based on the estimation of the gap, determining that the lens is within a far-field region;
   generating a tilt signal by deducting a second light signal intensity received by a second photodiode of a first photo detection from a first light signal intensity received by a first photodiode of the first photo detection; and after said step of generating a tilt signal and said step of determining that the lens is within a far-field region,
   estimating a tilt compensation for the lens according to the tilt signal, and
   performing a coarse tilt control on the lens according to the tilt compensation.

2. The method according to claim 1, wherein the step of estimating the gap between the lens and the disc comprises:
   estimating the gap between the lens and the disc according to a reflective light intensity.

3. The method according to claim 2, wherein the gap between the lens and the disc is estimated when the reflective light intensity starts to increase.

4. The method according to claim 1, wherein the step of estimating the tilt compensation for the lens according to the tilt signal comprises:
   sampling multiple tilt signals generated in response to multiple different tilt angles of the lens; and
   estimating a relation between the tilt signal and the tilt angle and finding the compensated tilt according to the relation.

5. The method according to claim 1, the method comprises:
   determining whether to start performing a fine tilt control on the lens according to a gap error signal when the lens is within the far-field region, wherein the gap error signal is the sum of light signal intensities received by all photodiodes of a second photo detection.

6. The method according to claim 5, wherein the step of determining whether to start performing the fine tilt control on the lens according to the gap error signal comprises:
   determining when to start the fine tilt control on the lens according to the decay in the gap error signal.

7. The method according to claim 1, wherein:
   the first and second light signal intensity are detected by the light reflected by the disc, penetrated a first numerical aperture (NA) region of the lens and collected by the first photo detection.

8. The method according to claim 2, wherein:
   the reflective light intensity is the sum of light signal intensities received by all photodiodes of a first photo detection and a second photo detection.

9. The method according to claim 4, wherein the estimation of the relation between the tilt signal and the tilt angle is performed during the initialization process of the near-field optical disc drive or manufacturing process of the near-field optical disc drive.

10. The method according to claim 4, wherein after the relation between the tilt signal and the tilt angle is obtained, the relation is stored in a memory.

11. The method according to claim 3, wherein the gap is smaller than 1000 nm when the reflective light intensity starts to increase.

12. The method according to claim 5, when the gap error signal decays to 30%-90% of that obtained when the lens is located in the far-field region, the fine tilt control is performed on the lens.

* * * * *